United States Patent Office 3,200,098
Patented Aug. 10, 1965

3,200,098
POLYMERIZATION OF ACRYLAMIDE MONOMER IN THE PRESENCE OF FREE AMMONIA AND THE RESULTING POLYACRYLAMIDE PRODUCT
Mayer B. Goren, Denver, Colo., assignor to Kerr-McGee Oil Industries, Inc., a corporation of Delaware
No Drawing. Filed Feb. 28, 1961, Ser. No. 92,157
21 Claims. (Cl. 260—80.3)

This invention relates to an improved process for the polymerization of acrylamide and the product thus produced. More particularly, this invention relates to a method for preparing very high molecular weight polyacrylamide which is still water-swellable and water-dispersible and exhibits substantial stability against degradation of its aqueous dispersions.

This application is a continuation-in-part of my copending application Serial No. 755,120, filed August 15, 1958, now abandoned.

In recent years polyacrylamide and copolymers thereof have become available commercially and some of these are widely used in ore processing as flocculants for slimes. Also, the literature describes the use of polyacrylamide and its copolymers as thickening agents, adhesives, paper sizing aids, flocculants, etc. All of these uses require that the polyacrylamide or its copolymers be dispersed or dissolved in a suitable medium such as water to facilitate the application of the polymers.

Experience has demonstrated that the higher the molecular weight of the polyacrylamide the better it is for use as a flocculant and for some of the other uses, provided it is still water-swellable and water-dispersible. Although a number of methods are available for making high molecular weight polyacrylamide and polyacrylamide copolymers, these methods give polyacrylamides which form aqueous dispersions that offer poor resistance to degradation on standing.

In general, the polymerization of acrylamide to make good flocculants gives rise to a number of problems which are difficult to overcome; namely, (1) the large heat of polymerization has to be dissipated; (2) the resulting polymer should have a high molecular weight but still be easily dispersed in water; (3) little, if any, of the toxic monomeric acrylamide should be left in the polymer; and (4) the water dispersion of said polymer should be stable against degradation with age.

As indicated above, there are several methods for polymerizing acrylamide but these methods do not provide a completely satisfactory solution to all of the above problems. To further illustrate these deficiencies, it may be noted that the dilute concentration process for polymerizing acrylamide described in U.S. Patent 2,625,529 solves the heat dissipation problem at the expense of obtaining a lower molecular weight polymer. The concentration or "runaway" polymerization process produces a high molecular weight polymer but the heat dissipation and water dispersion problems are aggravated. In like manner, other polymerization processes for acrylamide may be satisfactory in one or more aspects but very unsatisfactory in other aspects. Hence, it is well known that the polymer industry is avidly seeking better methods for effecting the controlled polymerization of acrylamide and its comonomers, i.e., the polymerization of a reaction mixture containing acrylamide.

Griffin D. Jones in U.S. Patent 2,831,841 discloses an interesting solution to the problem of elimination of toxic amounts of acrylamide from its polymers and copolymers. Jones treats the polyacrylamide product with ammonia to detoxify the polymeric product. Although this is an elegant solution to the toxicity problem, the process requires that the polymerization step be finished prior to the treatment of the polymer with ammonia. Hence, the process must comprise at least two steps, i.e., the polymerization step and the detoxification step.

Although Harry H. Dittmar in U.S. Patent 2,120,933 discloses that ammonia acts as an inhibitor to the polymerization of acrylamide and acrylic substances it has been discovered that acrylamide may be polymerized in the presence of at least about $1 \times 10^{-3}$ mol of ammonia per mol of acrylamide, or in the presence of at least about $1 \times 10^{-3}$ gram ion of ammonium ion, and at a pH of about 7.5 to 10 to provide a highly satisfactory solution to the problems normally associated with the polymerization of acrylamide. Not only are the aforesaid problems associated with the polymerization of acrylamide and its copolymers solved, but the polyacrylamide and polyacrylamide copolymers made in accordance with the invention are superior flocculating agents and have other desirable properties.

It was further discovered that the presence of a small essentially catalytic amount of ammonia, ammonium hydroxide, or the equivalent (for example, an ammonium salt plus base to produce free ammonia), referred to herein as "free ammonia," at the time the acrylamide is being polymerized does not tend to inhibit the polymerization reaction, but instead promotes the polymerization and gives a number of unexpected and very beneficial results. For example, the presence of a small amount of "free ammonia" in the form of, for example, ammonia or ammonium hydroxide at the time the polymerization is occurring produces the following observable and unexpected results:

(1) It decreases the induction period needed to start the active polymerization;

(2) The rate of polymerization appears to be accelerated when compared with a similar polymerization carried out in the absence of ammonia or ammonium hydroxide and at a pH less than about 7.5;

(3) The polymerization product is more stable in dilute aqueous dispersions to degradation on standing than similar products prepared in the absence of ammonia;

(4) The polymerization products are of higher molecular weight than those polymers prepared under similar conditions in the absence of ammonia;

(5) Although the polymerization products are of higher molecular weight than those prepared in the absence of ammonia, these higher molecular weight polymers are, relatively speaking, easily and readily dispersed in water; and (6) The water dispersions of the polyacrylamides prepared in the presence of added ammonia or ammonium hydroxide have superior flocculating ability for slimes when compared with those prepared from polymers made in the absence thereof, or a polymer which has been treated with ammonia in accordance with the teachings of U.S. Patent 2,831,841.

The quantity of additive providing the free ammonia such as ammonia, ammonium hydroxide, ammonium carbonate, or the equivalent which is present at the time of polymerization is critical. If the acrylamide is essentially free of harmful contamination, as little as $1 \times 10^{-3}$ mol of free ammonia per mol of acrylamide may be used and still obtain the six beneficial results enumerated above. Since the amount of impurities present in acrylamide varies due to variations in its method of preparation and purification, it is preferred to employ from $4.5 \times 10^{-3}$ to $1.5 \times 10^{-2}$ mol of free ammonia per mol of acrylamide. These levels are found to be quite satisfactory with all the commercial acrylamides and no real advantage is to be gained by using more free ammonia.

Treatment with free ammonia in excess of about $3 \times 10^{-1}$ mol per mol of acrylamide may lead to loss of appreciable quantities of acrylamide by side reactions such as formation of nitrilo trispropionamide. This is particularly true when the polymerization is carried out in relatively concentrated solution but it is minimized in dilute solution. Accordingly there is an upper limit both in the mol ratio of free ammonia to acrylamide (of about $3 \times 10^{-1}$) as well as of the absolute free ammonia concentration of about 0.75–1.0 molar), the combination of which should be borne in mind. The various free ammonia to acrylamide mol ratios may be employed effectively so long as the actual free ammonia concentration does not exceed about 0.75–1.0 molar. A preferred range of ratios is in the region of $4.5 \times 10^{-3}$ to $1.5 \times 10^{-2}$ mol free ammonia per mol acrylamide with a preferred absolute free ammonia concentration of about .05 to 0.25 molar. Under these conditions the desired effects are achieved without significant risk of encountering undesirable side reactions.

The additive may be added to the reactants prior to the start of the reaction or during the reaction as gaseous ammonia, liquid ammonia, aqueous ammonium hydroxide solution, or other suitable substance which is a source of ammonium ion. The addition of basic ammonium salts, such as ammonium carbonate, to the reactants gives the beneficial effects afforded by the addition of ammonia or ammonium hydroxide, but if ammonium sulfate and acidic or neutral ammonium salts are employed the pH of the reactants should be adjusted to about 7.5–10 so that the salt is converted to the free ammonia form.

Generally, it is preferred to add the additive to an aqueous solution of acrylamide prior to the introduction of the initiators or polymerization catalyst. Thus, free ammonia, i.e., ammonia or its equivalent can reduce the undesirable effects of metallic type inhibitors such as iron and copper by forming a complex or removing them as a precipitate from the solution. However, if the acrylamide is essentially free of contaminants, it is immaterial whether the additive, the initiator or catalyst is added first.

The terms "purified acrylamide" and "acrylamide essentially free of contaminants" are used to designate acrylamide that has received a special purification treatment such as sublimation, low pressure distillation or a careful fractionation from a mixed solvent, e.g., ethyl acetate-benzene.

It may be demonstrated that the impurities obtained as residues by treatment of commercial acrylamide by one of the above purification methods, for instance by sublimation, cause the erratic results often obtained when acrylamide is polymerized. For example, the addition of a small amount of such residues to purified acrylamide or some commercial acrylamides results in the polymer being a rigid, intractable gel while a control batch prepared without addition of the residue may normally be water-swellable and water-dispersible.

It has been discovered that the above indicated variations in the polymer properties from batch to batch are due to the presence of certain impurities or contaminants which are easily removed by the following methods: careful fractionation from a mixed solvent, sublimation and distillation at reduced pressure. From an analysis of the residue obtained by subjecting commercial acrylamide to one of the above purification processes, these impurities are thought to be certain inorganic materials which are metallic in nature such as iron, copper and nickel, and certain organic materials which are olefinic in nature and copolymerizable with acrylamide, water-soluble low molecular weight polymers and material of a related nature. When these impurities are removed the results obtained from batch to batch by the same polymerization method are more easily duplicated.

Although purification of commercial acrylamide by the aforesaid methods increases the probability that different batches of polyacrylamide polymer prepared by identical methods will have the same properties, it has been further discovered that if the polymerization is carried out in the presence of an additive such as ammonia and at a pH of about 7.5 to 10, the probability of obtaining identical results from batch to batch is greatly enhanced. This is true for highly purified acrylamide as well as for acrylamide obtained from different commercial sources. Thus an ancillary benefit derived from the presence of an additive such as ammonia or ammonium hydroxide and polymerization at a pH of about 7.5 to 10 is to increase the ease with which the results may be duplicated from batch to batch.

It has been observed that pH values of about 7.5 to 10 and preferably about 8 to 9 are not conducive to rapid hydrolysis of acrylamide at low temperature, but if higher temperatures are used, then it is preferred to adjust the pH to between about 7.5 and 8.5. The use of catalysts or initiators for polymerization reactions is well known and is disclosed in U.S. Patent 2,820,777, the teachings of which are incorporated herein by reference. In general, the polymerization catalyst or initiators are free radical catalysts and may be, for example, of the redox (reduction-oxidation) type or a catalyst such as an organic peroxide may be used alone.

The concentration of acrylamide in the reaction mixture is of importance as products which are not readily water-swellable and dispersible may be obtained at high concentrations. Usually, the concentration of acrylamide should not exceed about 15% by weight in aqueous polymerization systems. Preferably, the reaction mixture should contain about 2.5–15% by weight acrylamide.

Examples of ethylenically unsaturated co-monomers that are frequently copolymerized with acrylamide to obtain copolymers having different chemical and physical properties are acrylic acid, vinyl chloride, vinyl acetate, vinyl alcohol, methacrylic acid, methacrylamide, methylene-bis-acrylamide, etc. One of the most noticeable advantages obtained by copolymerizing acrylamide with co-monomer in the presence of an additive such as ammonia at basic pH conditions is the enhanced stability of the aqueous dispersion of the copolymer against degradation. Also, the copolymers prepared in the presence of ammonia are more readily dispersed in aqueous medium.

The foregoing detailed discussion and the following specific examples are for purposes of illustration only and are not to be taken as limiting to the appended claims.

In the examples which follow the reagent concentrations employed throughout are:

$K_2S_2O_9$ ---------------------------- g./liter -- 5.0
$Na_2SO_3$ ---------------------------- g./liter -- 1.0
$NH_4OH$ ----------------------------- molar -- 3.0 and the parts reagent added to the recited volume of the aqueous solution of acrylamide (save for acrylamide, co-monomer and water) are parts by volume of the aqueous solutions of the concentrations given above. The parts acrylamide, comonomer and water used in preparing the aqueous solution for polymerization are in parts by weight.

Examples I and II illustrate the improvement obtained by the dilute concentration polymerization of acrylamide in the presence of a soluble substance providing free ammonia in solution.

*Example I*

An aqueous solution of 1.0 part of acrylamide dissolved in 9.5 parts of water was sparged with purified nitrogen and into the solution was introduced 0.5 part potassium persulfate reagent and 0.2 part of sodium sulfite reagent. After ten minutes at room temperature, there was no evidence of polymerization as indicated by viscosity changes (reflected in the manner in which the nitrogen bubbles rise through the aqueous solution), and negative flocculating results were given when a small aliquot of the solution was added to a potash slime suspension. After several hours polymerization began and the resulting polymer was easily dispersed in water. The resulting water dispersion was tested as a flocculant for potash slimes and found to be only slightly better a high grade glue as a flocculant. After several days, the aqueous dispersion had degraded sufficiently to be essentially ineffective as a flocculant.

Example II

One-half part of 3 M ammonium hydroxide was added to an aqueous solution consisting of 1.0 part of acrylamide dissolved in 9.0 parts of water. While the mixture was being sparged with purified nitrogen, 0.5 part of potassium persulfate reagent and 0.2 part of sodium sulfite reagent were added as a redox catalyst. Within three minutes after the addition of the redox catalyst, polymerization was evidenced by the increase in viscosity. Within three hours, the polymerization had proceeded sufficiently to produce a highly viscous almost gelled solution without undue heat effect and the resulting mixture was essentially non-toxic. The dilute water dispersion of this polymer was an excellent flocculant and after 14 days, showed little evidence of degradation or loss of flocculant power.

To illustrate the beneficial effects on the rate of polymerization of acrylamide in the presence of ammonia, very dilute polymerization conditions are used in Example III.

Example III (a) 1.0 part acrylamide, 22.5 parts water and 1 part potassium persulfate solution were sparged with nitrogen for ten minutes at which time 2.5 parts sodium sulfite solution were added and the sparging continued. The reactants were initially at room temperature and the viscosity of the solution gradually rose during a three hour period. The reaction vessel was stoppered and the mixture allowed to stand for an additional 20 hours, after which it was heated at 65° C. for 7½ hours. The product was dispersed in water to a concentration of 0.5%.

(b) For comparison an identical experiment was carried out save that only 21 parts of water was used and 1.5 parts of 3 M ammonium hydroxide was added. Within thirty minutes of the addition of the activator the solution had become very viscous. The remainder of the treatment was the same as in part (a). The product was definitely more viscous when dispersed then product (a). However, both products exhibited very good flocculating activity toward slimes obtained in the leaching of uranium ore.

During the succeeding fourteen days the solution of product (a) above lost its viscosity until it resembled little more than water, while the solution of product (b) above retained its viscosity. At the same time the flocculating activity of product (a) diminished to a low unsatisfactory level, while that of (b) was unaltered. Such behavior was consistently observed in pairs of numerous samples polymerized under a variety of conditions as regards concentration and monomer to catalyst ratio, but differing only in the presence or absence of ammonia.

Example IV

The experiment of Example III was repeated except 0.001 part of methylene-bis-acrylamide was added to the acrylamide solution before the polymerization started. The copolymer prepared in the presence of the ammonia gave a dilute dispersion which was superior in flocculating ability and in aging stability to the dilute dispersion of the product prepared in the absence of ammonia.

Example V

A large sample of commercial acrylamide, which frequently gave polymers that were intractable gels when polymerized in the absence of ammonia, was charged to a vacuum sublimation apparatus. The pressure on the vacuum sublimation apparatus was maintained at 1 mm. absolute pressure and a sublimate of acrylamide was obtained at temperatures from ambient up to just below the melting point of acrylamide. The sublimate of acrylamide was caught on a cold finger forming part of the apparatus. This product is referred to hereinafter as sublimed acrylamide and is equivalent to highly purified acrylamide.

Example VI 1.0 part of highly purified sublimed acrylamide sample from Example V was dissolved in 20 parts of water, sparged with nitrogen for 10 minutes and then 1.0 part of the potassium persulfate solution was added. Sparging was continued and after five minutes 1.0 part of the sodium sulfite solution was added. During a period of 80 minutes there was no evidence of polymerization, and afe 7½ hours only a slight increase in viscosity was evident. The mixture was sparged for 48 hours at ambient temperature and then heated for 15 hours at 60° C. When dispersed to 0.5% concentration in water the product had very little viscosity.

Example VII

The conditions of Example VI were duplicated with a second sample of highly purified sublimed acrylamide from Example V except that 0.5 part of 3 molar ammonium hydroxide were added to the solution before the initiator and activator were added. There followed an induction period of less than seven minutes when viscosity increase became evident. The polymerization was continued and completed exactly as in Example VI and the product was a firm semi-gel which was readily dispersed in water to 0.5% concentration.

What is claimed is:

1. A polymerization process comprising reacting an alkaline aqueous reaction mixture containing initially not more than about 15% by weight of acrylamide monomer in the presence of a free radical catalyst and a water soluble substance providing $1 \times 10^{-3}$ to $3 \times 10^{-1}$ mol of free ammonia per mol of acrylamide monomer initially present to produce a water swellable and dispersible polymerization product.

2. A polymerization process comprising reacting an alkaline aqueous reaction mixture containing initially not more than about 15% by weight of acrylamide monomer in the presence of a free radical catalyst and a water soluble substance providing $1 \times 10^{-3}$ to $3 \times 10^{-1}$ mol of free ammonia per mol of acrylamide monomer initially present at a pH of about 7.5 to 10 to produce a water swellable and dispersible polymerization product, the molar concentration of free ammonia in the aqueous reaction mixture not exceeding about 1.0.

3. A process for preparing polyacrylamide comprising polymerizing acrylamide monomer in aqueous solution in the presence of a free radical catalyst and a water soluble substance providing about $1 \times 10^{-3}$ to $3 \times 10^{-1}$ mol of free ammonia per mol of acrylamide monomer initially present at a pH of about 7.5 to 10 to produce a water swellable and dispersible polymerization product, the aqueous solution containing initially about 2.5 to 15% by weight of acrylamide monomer.

4. A process for preparing polyacrylamide comprising polymerizing acrylamide monomer in aqueous solution in the presence of a free radical catalyst and at least one substance providing free ammonia selected from the group consisting of ammonia and amonium hydroxide in an amount of about $1 \times 10^{-3}$ to $3 \times 10^{-1}$ mol per mol of acrylamide monomer initially present at a pH of about 7.5 to 10 to produce a water swellable and dispersible polymerization product, the aqueous solution containing initially about 2.5 to 15% by weight of acrylamide monomer.

5. A process for preparing polyacrylamide comprising polymerizing acrylamide monomer in aqueous solution in the presence of a free radical catalyst and a water soluble substance providing about $1 \times 10^{-3}$ to $3 \times 10^{-1}$ mol of free ammonia per mol of acrylamide monomer initially present at a pH of about 8 to 9 to produce a water swellable and dispersible polymerization product, the aqueous solution containing initially about 2.5 to 15% by weight of acrylamide monomer.

6. A process for preparing polyacrylamide comprising polymerizing acrylamide monomer in aqueous solution in the presence of a free radical catalyst and at least one substance providing free ammonia selected from the group consisting of ammonia and ammonium hydroxide in an amount of about $1 \times 10^{-3}$ to $3 \times 10^{-1}$ mol per mol of acrylamide monomer initially present at a pH of about 8 to 9 to produce a water swellable and dispersible polymerization product, the aqueous solution containing initially about 2.5 to 15% by weight of acrylamide monomer.

7. A process for preparing polyacrylamide comprising polymerizing acrylamide monomer in aqueous solution in the presence of a free radical catalyst and a water soluble substance providing about $4.5 \times 10^{-3}$ to $1.5 \times 10^{-2}$ mol of free ammonia per mol of acrylamide monomer initially present at a pH of about 7.5 to 10 to produce a water swellable and dispersible polymerization product, the aqueous solution containing initially about 2.5 to 15% by weight of acrylamide monomer.

8. A process for preparing polyacrylamide comprising polymerizing acrylamide monomer in aqueous solution in the presence of a free radical catalyst and at least one substance providing free ammonia selected from the group consisting of ammonia and ammonium hydroxide in an amount of about $4.5 \times 10^{-3}$ to $1.5 \times 10^{-2}$ mol per mol of acrylamide monomer initially present at a pH of about 7.5 to 10 to produce a water swellable and dispersible polymerization product, the aqueous solution containing initially about 2.5 to 15% by weight of acrylamide monomer.

9. A process for preparing polyacrylamide comprising polymerizing acrylamide monomer in aqueous solution in the presence of a free radical catalyst and a water soluble substance providing about $4.5 \times 10^{-3}$ to $1.5 \times 10^{-2}$ mol of free ammonia per mol of acrylamide monomer initially present at a pH of about 8 to 9 to produce a water swellable and dispersible polymerization product, the aqueous solution containing initially about 2.5 to 15% by weight of acrylamide.

10. A process for preparing polyacrylamide comprising polymerizing acrylamide monomer in aqueous solution in the presence of a free catalyst and at least one substance providing free ammonia selected from the group consisting of ammonia and ammonium hydroxide in an amount of about $4.5 \times 10^{-3}$ to $1.5 \times 10^{-2}$ mol per mol of acrylamide monomer initially present at a pH of about 8 to 9 to produce a water swellable and dispersible polymerization product, the aqueous solution containing initially about 2.5 to 15% by weight of acrylamide monomer.

11. A polymerization process comprising reacting an alkaline aqueous reaction mixture containing initially not more than about 15% by weight of acrylamide monomer and an ethylenically unsaturated comonomer copolymerizable therewith in the presence of a free radical catalyst and a water solution substance providing $1 \times 10^{-3}$ to $3 \times 10^{-1}$ mol of free ammonia per mol of acrylamide monomer and comonomer initially present to produce a water swellable and dispersible copolymerization product.

12. The process of claim 11 wherein the acrylamide monomer consists essentially of acrylamide.

13. The process of claim 11 wherein the ethylenically unsaturated comonomer is methylene-bis-acrylamide.

14. A polymerization process comprising reacting an alkaline aqueous reaction mixture containing initially not more than about 15% by weight of acrylamide monomer and an ethylenically unsaturated comonomer copolymerizable therewith in the presence of a free radical catalyst and a water soluble substance providing $1 \times 10^{-3}$ to $3 \times 10^{-1}$ mol of free ammonia per mol of acrylamide monomer and comonomer initially present at a pH of about 7.5 to 10 to produce a water swellable and dispersible copolymerization product, the molar concentration of free ammonia in the aqueous reaction mixture not exceeding about 1.0.

15. The process of claim 14 wherein the acrylamide monomer consists essentially of acrylamide.

16. The process of claim 14 wherein the ethylenically unsaturated comonomer is methylene-bis-acrylamide.

17. A polymerization process comprising reacting an alkaline aqueous reaction mixture containing initially not more than about 15% by weight of acrylamide monomer and an ethylenically unsaturated comonomer copolymerizable therewith in the presence of a free radical catalyst and at least one substance providing free ammonia selected from the group consisting of ammonia and ammonium hydroxide in an amount of about $4.5 \times 10^{-3}$ to $1.5 \times 10^{-2}$ mol per mol of acrylamide monomer and comonomer initially present at a pH of about 7.5 to 10 to produce water swellable and dispersible copolymerization product.

18. The process of claim 17 wherein the acrylamide monomer consists essentially of acrylamide.

19. The process of claim 18 wherein the ethylenically unsaturated comonomer is methylene-bis-acrylamide.

20. The process of claim 19 wherein about 0.001 part by weight of the methylene-bis-acrylamide is present based upon the weight of the aqueous reaction mixture.

21. The process of claim 10 wherein the polymerization catalyst comprises a water soluble persulfate and a water soluble sulfite.

References Cited by the Examiner
UNITED STATES PATENTS

| | | | |
|---|---|---|---|
| 2,120,933 | 6/38 | Dittmar | 260—89.7 |
| 2,289,540 | 7/42 | Dittmar | 260—89.7 |
| 2,775,579 | 12/56 | Erchak | 260—80 |
| 2,806,018 | 9/57 | Price | 260—89.7 |
| 2,820,777 | 1/58 | Suen | 260—89.7 |
| 2,831,841 | 4/58 | Jones | 260—89.7 |

JOSEPH L. SCHOFER, *Primary Examiner.*

H. N. BURSTEIN, WILLIAM H. SHORT, LEON J. BERCOVITZ, *Examiners.*